United States Patent [19]
Masuda et al.

[11] Patent Number: 5,981,922
[45] Date of Patent: Nov. 9, 1999

[54] BRAZING APPARATUS HAVING ELECTROMAGNETIC INDUCTION PUMPS FOR MOVING A BRAZING FILLER METAL IN CONTACT WITH A WORKPIECE

[75] Inventors: Tsugunori Masuda, Honno; Junichi Onozaki, Sayama; Hiroshi Saito, Tokorozawa, all of Japan

[73] Assignee: Kabushiki Kaisha Tamura Seisakusho, Japan

[21] Appl. No.: 09/011,453

[22] PCT Filed: Jun. 10, 1997

[86] PCT No.: PCT/JP97/01982

§ 371 Date: Jun. 11, 1998

§ 102(e) Date: Jun. 11, 1998

[87] PCT Pub. No.: WO97/47422

PCT Pub. Date: Dec. 18, 1997

[30] Foreign Application Priority Data

Jun. 11, 1996 [JP] Japan ................................. 8-149591

[51] Int. Cl.[6] .................................................... B23K 13/01
[52] U.S. Cl. .............................................. 219/615; 228/37
[58] Field of Search .................................. 219/615, 645, 219/616, 617; 228/37

[56] References Cited

U.S. PATENT DOCUMENTS

| | | | |
|---|---|---|---|
| 3,885,890 | 5/1975 | Davidson | 417/50 |
| 4,622,445 | 11/1986 | Matsen | 219/615 |
| 4,874,918 | 10/1989 | Okubo et al. | 219/615 |
| 5,382,860 | 1/1995 | Fanning | 310/216 |
| 5,452,843 | 9/1995 | Dennis | 228/222 |
| 5,591,370 | 1/1997 | Matsen et al. | 219/645 |

*Primary Examiner*—Teresa Walberg
*Assistant Examiner*—Jeffrey Pwu
*Attorney, Agent, or Firm*—Morrison Law Firm

[57] ABSTRACT

A single reservoir contains brazing filler metal. A first electromagnetic induction pump extends vertically along a vertical plate portion at a workpiece inlet side. A second electromagnetic induction pump extends vertically along a vertical plate portion at the workpiece outlet side. Heaters for melting the brazing filler metal are disposed between the first electromagnetic induction pump and the second electromagnetic induction pump. Each electromagnetic induction pump has a first iron core having an induction coil wound therearound disposed at the outer side of a vertical plate portion at the workpiece inlet side or the workpiece outlet side respectively. A second iron core is disposed at the inner side of the respective vertical plate portion. A brazing filler metal rising gap is disposed between the second iron cores.

9 Claims, 7 Drawing Sheets

BRAZING APPARATUS HAVING ELECTROMAGNETIC INDUCTION PUMPS FOR MOVING A BRAZING FILLER METAL IN CONTACT WITH A WORKPIECE

TECHNICAL FIELD

The present invention relates to a brazing apparatus using an electromagnetic induction pump.

BACKGROUND

Figure 9:
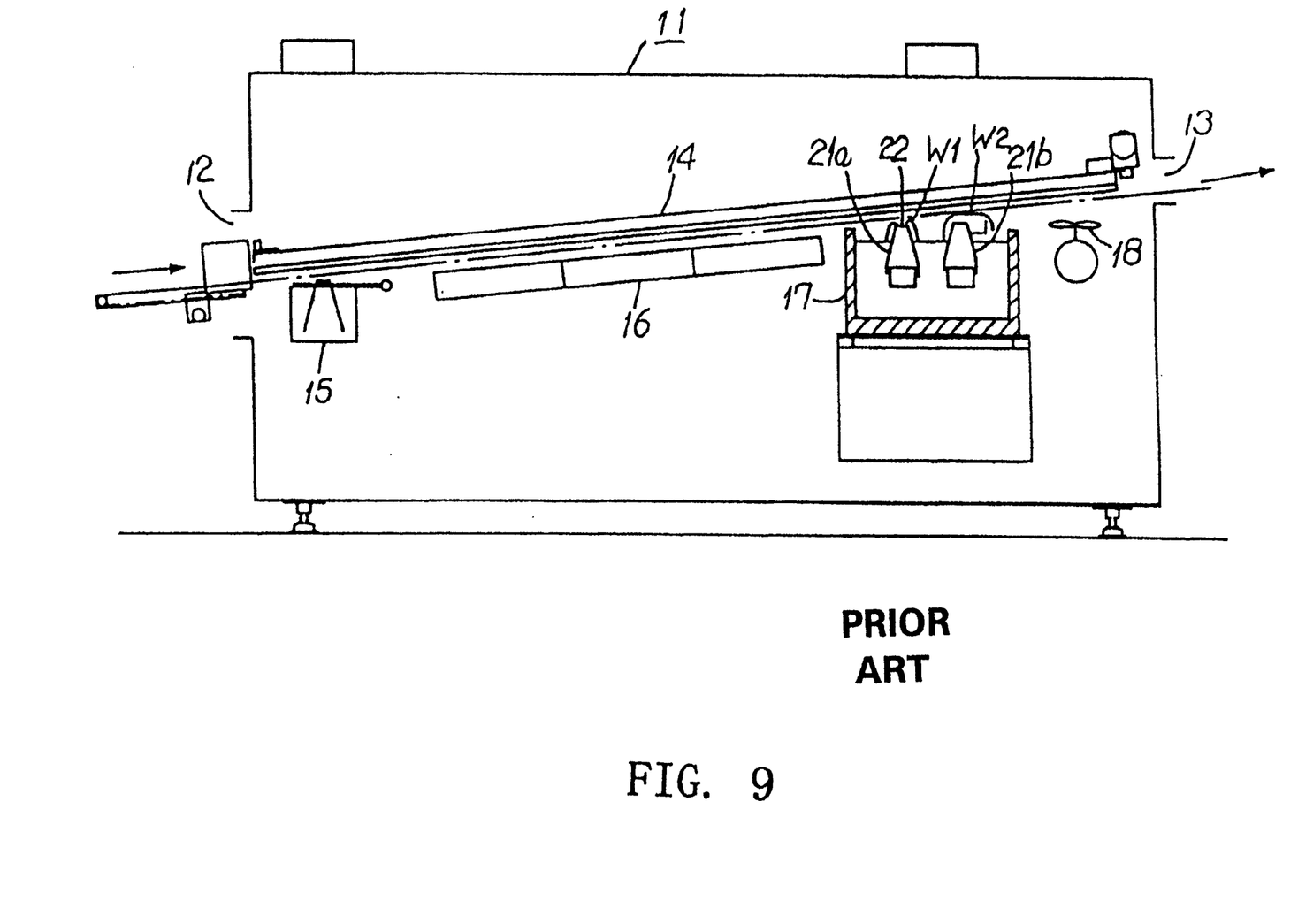
FIG. 9 is a schematic illustration of a conventional wave soldering device.

FIG. 9 shows the general structure of a conventional wave soldering device, wherein a work conveyor 14 adapted to convey workpieces to be soldered, such as component-mounted substrates or the like, extends from a workpiece inlet 12 to a workpiece outlet 13 of a device cover 11.

A fluxer 15 for applying foamed flux to workpieces, a preheater 16 for preheating the workpieces, a solder bath 17 for soldering the workpieces by using molten solder ejected from wave nozzles, and a fan 18 for cooling the workpieces after soldering are arranged in this order along the conveyor 14.

A primary wave nozzle 21a and a secondary wave nozzle 21b are disposed in the solder bath 17. A wave-forming plate 22 has numerous ejection holes is provided at the open top of the primary wave nozzle 21a. The primary wave nozzle 21a is adapted to feed molten solder over the entire workpiece, covering every corner of the electrode portions and other parts of chip components by means of numerous small primary waves W1 which are ejected as irregular spouts from the ejection holes of the wave-forming plate 22. The secondary wave nozzle 21b is adapted to adjust the shapes of soldered parts by means of gentle secondary waves W2.

Figure 10:
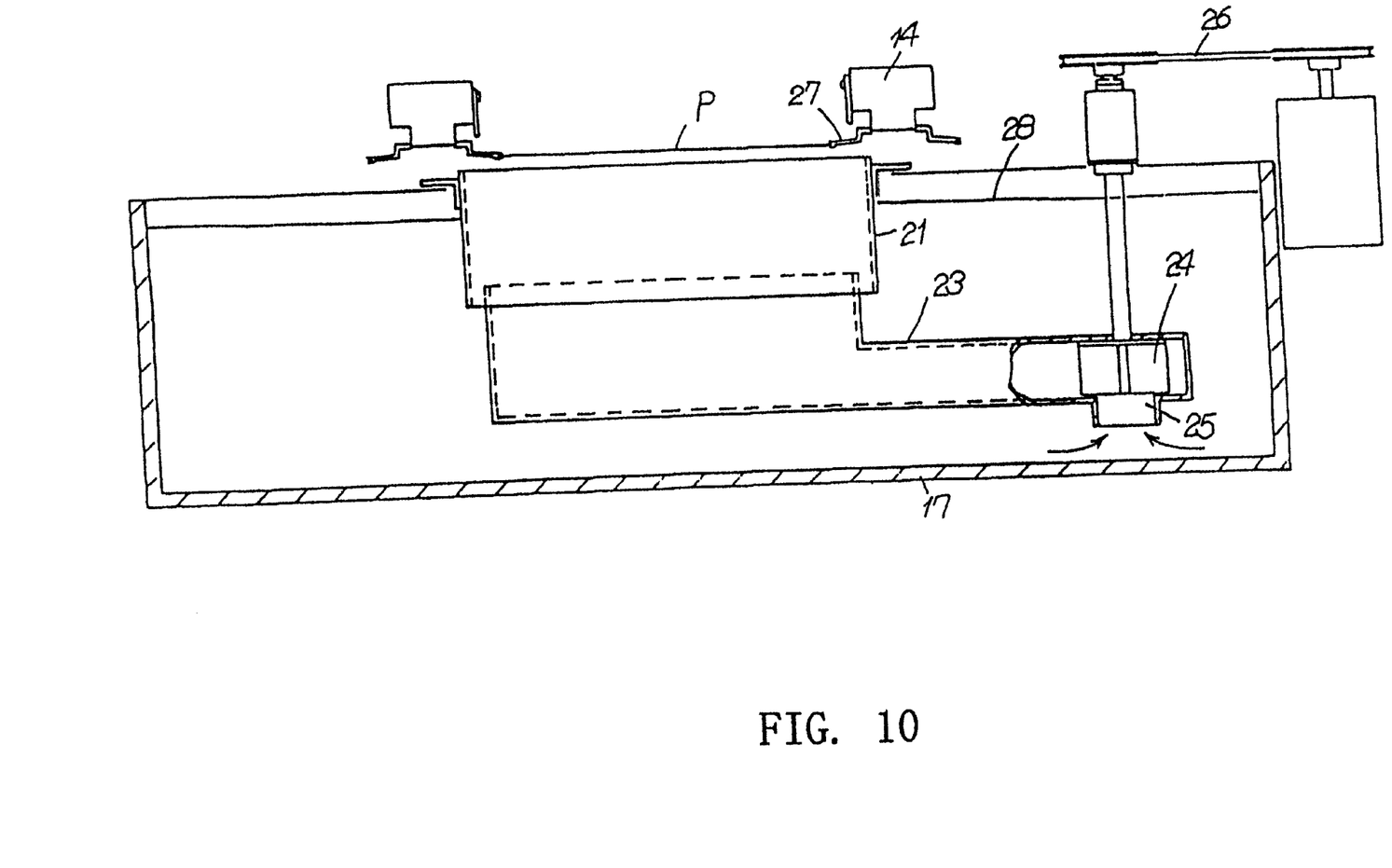
FIG. 10 is a sectional view of a solder bath of the conventional wave soldering device.

As shown in FIG. 10, the solder bath 17 is provided with a pressure duct 23 fitted in an opening at the bottom of the nozzle body 21 of the wave nozzles 21a, 21b, and a pump impeller 24 disposed at the end of the pressure duct 23. The solder bath 17 also includes a suction opening 25 and a motor drive mechanism 26 associated with the pump impeller 24.

Molten solder introduced from the suction opening 25 as a result of rotation of the pump impeller 24 is fed under pressure through the pressure duct 23 into the nozzle body 21 and emitted from the nozzle body 21 in waves so that the undersides of workpieces P, which may be component-mounted substrates, are soldered while they are conveyed, being held between conveyor claws 27 of the conveyor 14. The major part of the solder waves directly returns onto the molten solder surface 28 in the solder bath 17 and is circulated into the suction opening 25 of the pump impeller 24.

Various brazing apparatuses using an electromagnetic pump are disclosed in, for example, Japanese Patent Publication Nos. 42590-1976, 31628-1990 and 60581-1991, and Japanese Utility Model Publication No. 17572-1988. Electromagnetic pumps used in those brazing apparatuses are either a direct current type or an alternating current type.

A direct-current type electromagnetic pump is adapted to generate a thrusting force to a conductive brazing filler metal, such as tin, over its path of motion by applying a magnetic field perpendicularly to the path of the conductive brazing filler metal and feeding direct electric current perpendicularly to both the path of motion and the magnetic field.

An alternating-current type electromagnetic pump is an electromagnetic induction pump which includes induction coils arranged on a plane along a path traveled by a conductive brazing filler metal and is adapted to generate a thrusting force to the brazing filler metal by feeding AC current having lagged phases to the induction coils, thereby generating a shifting magnetic field in the path traveled by the conductive brazing filler metal to permit the electromagnetic induction to generate electromotive force on the conductive brazing filler metal in its path of motion so that electric current generated by the electromotive force of the brazing filler metal flows in the magnetic flux in the magnetic field.

With a wave soldering device of a type which calls for force-feeding molten solder by means of a pump impeller rotated by a conventional motor drive mechanism, it is difficult to reduce the amount of solder, because of structural limitations in how small the solder bath can be.

To be more precise, as the solder bath has to be sufficiently deep in order to prevent oxidized solder from being entangled in the portion where the impeller is turning, the volume of the entire solder bath becomes large.

On the other hand, although a conventional brazing apparatus which calls for force-feeding brazing filler metal by using an electromagnetic pump and ejecting it in the form of waves requires less brazing filler metal compared with the wave soldering device described above, it occupies a considerable space along the conveyance path of workpieces.

For this reason, unlike a motor-driven wave soldering device, no conventional electromagnetic pump type brazing apparatus has ever employed the art that calls for serially arranging two brazing apparatus and performing two kinds of brazing by means of primary waves and secondary waves.

Simply arranging two conventional electromagnetic pump type brazing apparatuses to be used respectively for primary brazing and secondary brazing would not only double the surface area of the device, which would take up too much space, but would also require twice as much brazing filler metal.

Due to environmental protection regulations, the demands for brazing filler metal which does not contain lead (what is generally called lead-free solder) are recently on the increase. Because lead-free solders are made of materials such as indium or the like, which are 3 to 10 times as expensive as ordinary solder made of tin and lead, it is necessary to reduce the quantity of the brazing filler metal to be used as much as possible.

In order to solve the above problems, an object of the present invention is to provide an electromagnetic pump type brazing apparatus which is capable of forming waves at a plurality of locations without taking up much space. Another object of the present invention is to provide an electromagnetic pump type brazing apparatus which is capable of reducing the quantity of brazing filler metal.

DISCLOSURE OF INVENTION

A brazing apparatus according to the invention includes a reservoir adapted to contain brazing filler metal, and a plurality of electromagnetic induction pumps, the reservoir having a plurality of vertically extending vertical plate portions in the shape of a plate, and the electromagnetic induction pumps disposed along the vertical plate portions and adapted to braze workpieces by ejecting upward the brazing filler metal contained in the reservoir.

As the electromagnetic induction pumps arranged along a plurality of vertical plate portions of the reservoir take up only a limited space, a compact brazing apparatus which is capable of forming more than one type of waves is provided.

According to another feature of the invention, a plurality of electromagnetic induction pumps of a brazing apparatus are associated with a single reservoir.

As a single reservoir is shared by a plurality of electromagnetic induction pumps, the interior of the reservoir can be formed compact by arranging a plurality of vertical plate portions close to one another, and the quantity of the brazing filler metal in the reservoir can be reduced compared with a structure which calls for a separate reservoir for each pump.

According to another feature of the invention, each electromagnetic induction pump of a brazing apparatus comprises a first iron core disposed in close contact with the outer side face of a vertical plate portion, an induction coil wound around the first iron core, a second iron core disposed in parallel to the inner side face of the vertical plate portion, and a brazing filler metal rising gap provided between the vertical plate portion and the second iron core.

As the first iron cores around which the induction coils are wound are disposed outside the vertical plate portions of the reservoir, maintenance of the induction coils or a similar operation can be easily done from the outside.

According to another feature of the invention, the reservoir of the brazing apparatus is provided with heaters for melting brazing filler metal, which are disposed between the electromagnetic induction pumps.

With the configuration as above, brazing filler metal ejected by means of the electromagnetic induction pumps can be melted efficiently by the common heaters.

In addition, according to another feature of the invention, the brazing apparatus includes a plurality of removable nozzles which are respectively disposed on the electromagnetic induction pumps and are adapted to eject brazing filler metal therefrom.

With the configuration as above, maintenance of the nozzles themselves or cleaning of the inside of an electromagnetic induction pump can be easily done by removing the nozzle.

DETAILED DESCRIPTION OF THE PREFERRED EMBODIMENT

Figure 1:
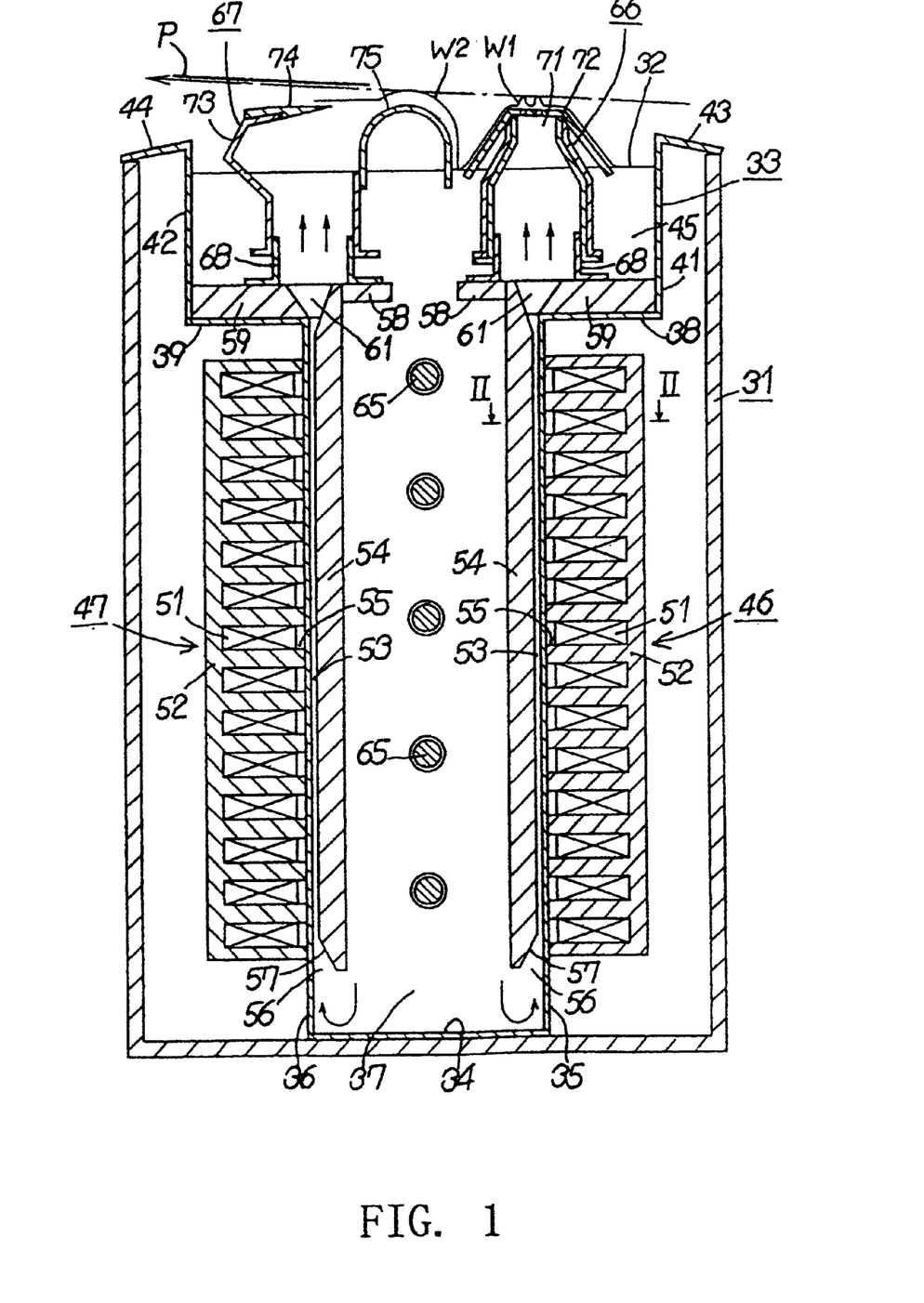
FIG. 1 is a sectional view of a brazing apparatus according to an embodiment of the invention.
Figure 2:
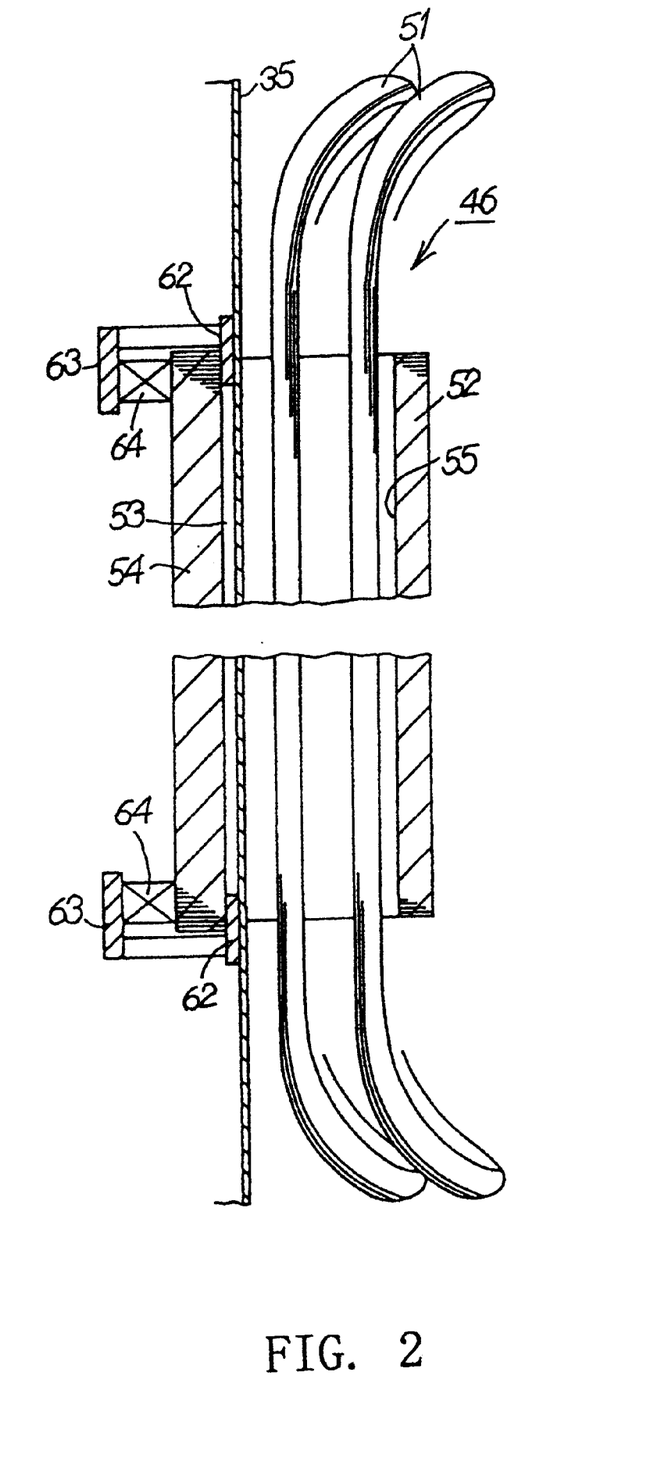
FIG. 2 is a sectional view taken on line II—II of FIG. 1.

Next, the configuration of an embodiment of the invention is explained hereunder, referring to FIGS. 1 and 2.

As shown in FIG. 1, a single reservoir 33 adapted to contain conductive brazing filler metal 32, which may be tin, indium or the like, is disposed in the main body 31 of the device, which is open at the top.

The reservoir 33 comprises a pump reservoir portion 37 and a wave forming reservoir portion 45. The pump reservoir portion 37 is comprised of a bottom plate portion 34, a first vertical plate portion 35 located at the bottom of the workpiece inlet side, a second vertical plate portion 36 located at the bottom of the workpiece outlet side, and vertical plate portions (not shown) which are located at the lateral sides of the reservoir with respect to the direction in which workpieces are conveyed. The wave forming reservoir portion 45 is comprised of horizontal plate portions 38,39 which are respectively located at the upper portions of the workpiece inlet side and the workpiece outlet side, vertical plate portions 41,42, upper rim portions 43,44, and vertical plate portions (not shown) which are located at the lateral sides of the reservoir with respect to the direction in which workpieces are conveyed. Each vertical plate portion mentioned above is a vertically extending plate-shaped member.

A first electromagnetic induction pump 46 and a second electromagnetic induction pump 47 are both disposed in the reservoir 33. The first electromagnetic induction pump 46 vertically extends along the first vertical plate portion 35 at the workpiece inlet side of the interior of the reservoir 33, while the second electromagnetic induction pump 47 vertically extends along the second vertical plate portion 36 at the workpiece outlet side of the interior of the reservoir 33.

The first electromagnetic induction pump 46 is formed by disposing a first iron core 52, around which an induction coil 51 is wound, in close contact with the outer surface of the vertical plate portion 35 at the workpiece inlet side in the reservoir 33 and disposing a second iron core 54 at the inner side of the vertical plate portion 35 in such a manner as to extend parallel to the vertical plate portion 35 with a gap 53 therebetween to permit the brazing filler metal to rise. The second electromagnetic induction pump 47 is likewise formed by disposing a first iron core 52, around which an induction coil 51 is wound, in close contact with the outer surface of the vertical plate portion 36 at the workpiece outlet side in the reservoir 33 and disposing a second iron core 54 at the inner side of the vertical plate portion 36 in such a manner as to extend parallel to the vertical plate portion 36 with a gap 53 therebetween.

Each first iron core 52 consists of numerous grooves 55, which are vertically arranged so that numerous grooves 55 open toward the associated vertical plate portion 35 or 36, to face the corresponding grooves 55 of the opposite iron core 52. The induction coil 51 is placed in these grooves 55 extending along the grooves in the state it is wound around, at appropriate intervals, the extended portions of these grooves.

Each second iron core 54 includes a slanted face portion 57 which forms a suction opening 56 at the bottom of the iron core, nozzle mount portions 58,59 integrally formed at the top of the iron core, and a discharge opening 61 which is so formed at the base of the mount portion 59 as to open upward.

As shown in FIG. 2, the first iron cores 52 and the second iron cores 54 are formed by stacking numerous thin iron plates in the widthwise direction. Together with spacers 62, each flat, plate-shaped second iron core 54 forms a brazing filler metal rising gap 53 between the iron core and the vertical plate portion 35 or 36. Further, each second iron core 54 is secured by a pressing mechanism 64 which may be springs or the like disposed between the spacers 62 and end plates 63 provided opposite the spacers 62.

Referring again to FIG. 1, a plurality of heaters 65 for melting brazing filler metal 32 are vertically arranged at the middle of the reservoir 33, halfway between the first electromagnetic induction pump 46 and the second electromagnetic induction pump 47. These heaters 65 are sheathed type heaters elongated in the widthwise direction (as viewed in FIG. 1, the direction perpendicularly intersecting the sheet of the drawing).

A first nozzle 66 and a second nozzle 67 adapted to eject the brazing filler metal 32 are removably disposed, respectively above the first electromagnetic induction pump 46 and the second electromagnetic induction pump 47.

To be more specific, nozzle mounting plates 68 are respectively affixed to the nozzle mounts 58,59 of the second iron cores 54 at the workpiece inlet side and the workpiece outlet side. The first nozzle 66 and the second nozzle 67 are removably fitted over the respective nozzle mounting plates 68.

The first nozzle 66 is provided with a wave-forming plate 72 attached to an aperture 71 at the top of the first nozzle 66, the wave-forming plate 72 including a large number of ejection holes bored therein in order to form numerous primary waves W1 to be spouted in the shape of protrusions which will move irregularly.

The second nozzle 67 is adapted to form smooth secondary waves W2 by means of a directing plate 73 bent in the direction opposite the direction in which workpieces P are conveyed. A directing fin 74 projects from the tip of the directing plate 73 in the direction opposite the workpiece conveyance direction. A guide plate 75 having a cross section in the shape of the inverted U is attached to the opposite side of the nozzle.

Next, the function of the embodiment shown in FIGS. 1 and 2 is explained hereunder.

The first and second electromagnetic induction pumps 46,47 supply AC current having lagged phases, such as three-phase AC current, to the induction coils 51 which are vertically arranged along the brazing filler metal rising gaps 53, thereby generating shifting magnetic fields in the respective brazing filler metal rising gaps 53 so that electromagnetic induction generates electromotive force on the conductive brazing filler metal in the brazing filler metal rising gaps 53. As a result, electric current generated by the electromotive force of the brazing filler metal flows in the magnetic flux in each magnetic field and thereby generates upward thrusting force on the brazing filler metal 32 so that the brazing filler metal moves upward.

The brazing filler metal 32 is melted by the common heaters 65 and introduced through the suction openings 56 by the respective electromagnetic induction pumps 46,47, and moves up the brazing filler metal rising gaps 53 along the vertical plate portions 35,36, which are respectively located at the workpiece inlet side and the outlet side of the reservoir 33. The brazing filler metal 32 is then discharged from the discharge openings 61 and emitted through the first nozzle 66 and the second nozzle 67 as the primary wave W1 and the secondary wave W2 respectively. Then, after components are brazed onto the surfaces of the substrates of the workpiece P that are carried into and out of the waves, the brazing filler metal 32 falls back into the wave forming reservoir portions 45 and circulates into the pump reservoir portions 37.

As the brazing filler metal rising gaps 53 of the electromagnetic induction pumps 46,47 are formed straight, without a bent portion, the height of the first waves W1 and second waves W2 can be easily made uniform along the width (the dimension in the direction perpendicular to the sheet of FIG. 1) of the reservoir 33.

The primary waves W1, which are in the shape of small protrusions moving in an irregular fashion, are capable of entering into every gap of micro components on a substrate packaged with a high density, ensuring excellent wettability of every brazed portion, while smooth, arc-shaped secondary waves W2 directed counter to the direction of the conveyance of the substrates smooth out excessive brazing, thereby preventing defects such as so-called bridges, icicles, etc.

Whenever it is necessary, both the first and second nozzles 66,67 can be removed from the nozzle mounting plates 68 adjacent to their respective second iron cores in order to conduct maintenance of the nozzles 66,67 themselves or clean the interiors of the brazing filler metal rising gaps 53 of the electromagnetic induction pumps 46,47.

When the first nozzle 66 or the second nozzle 67 is removed, the top of the discharge opening 61 of the associated second iron core 54 is opened. In this state, cleaning of the brazing filler metal rising gap 53 or other maintenance work can be easily done by inserting an elongated bar or plate into the brazing filler metal rising gap 53.

Providing the suction openings 56 near the bottom plate portion 34 at a sufficient distance from the surface of the brazing filler metal 32, where oxides or other substances are floating, has an advantage in that oxides or other foreign substances will not easily be sucked into the suction openings 56 by accident. Even if oxides or other substances become lodged in a suction opening 56, they can be easily removed by inserting an elongated bar or the like into the brazing filler metal rising gap 53 without the need of taking the second iron core 54 or other components apart.

Furthermore, as the brazing filler metal 32 in a brazing filler metal rising gap 53 can be moved in the reverse direction, i. e. downward, by reversing the phase of the three-phase AC current fed to the induction coil 51, oxide or other substances caught in a suction opening 56 can be easily removed by means of back washing using the brazing filler metal which is ejected backward.

Although each brazing filler metal rising gap 53 is so formed as to extend vertically according to the embodiments shown in the drawings, it may be slightly angled as long as it extends nearly vertically.

Figure 3:
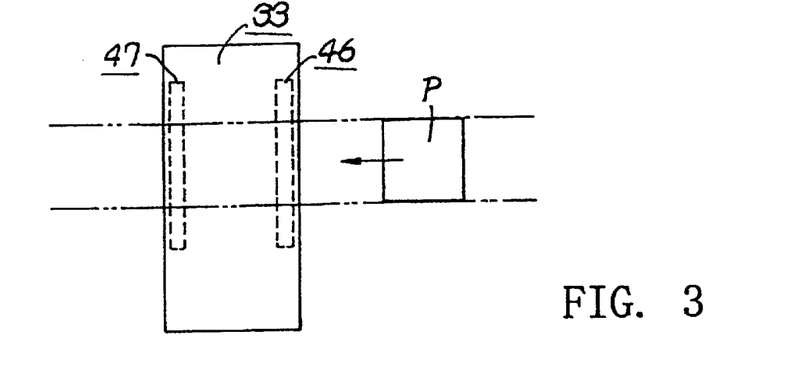
FIG. 3 is a top view of the brazing apparatus shown in FIG. 1.

According to the embodiment shown in FIGS. 1 and 2, the first electromagnetic induction pump 46 and the second electromagnetic induction pump 47 extend vertically along the vertical plate portions 36 which form the reservoir 33, the first electromagnetic induction pump 46 extending along the vertical plate portion 35 at the workpiece inlet side of and the second electromagnetic induction pump 47 extending along the vertical plate portion 36 at the workpiece outlet side as also shown in FIG. 3. However, the present invention is not limited to the structure of this embodiment.

Figure 4:
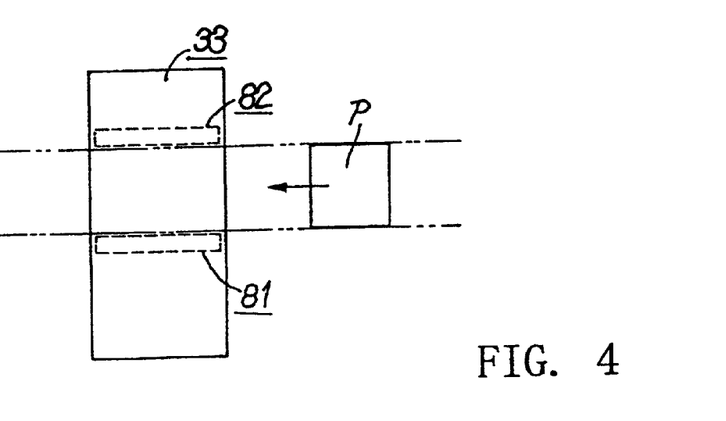
FIG. 4 is a top view of a brazing apparatus according to another embodiment of the invention.
Figure 5:
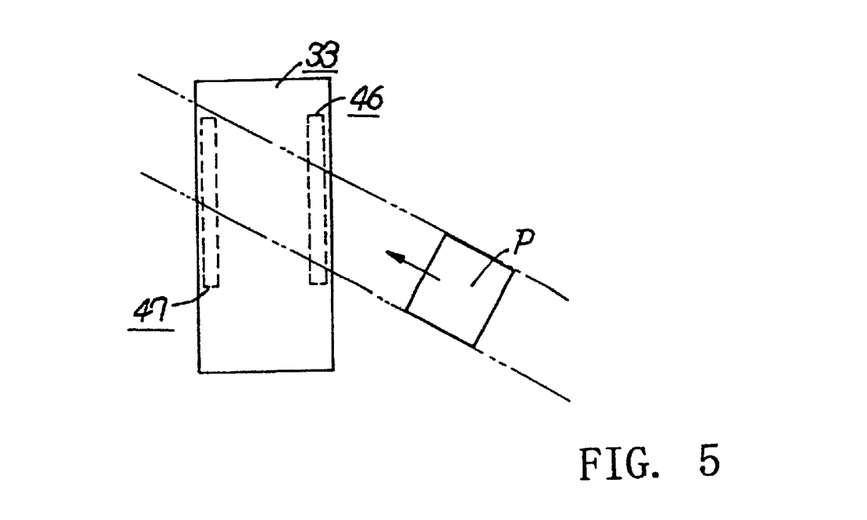
FIG. 5 is a top view of a brazing apparatus according to yet another embodiment of the invention.

For example, an embodiment shown in FIG. 4, wherein a first electromagnetic induction pump 81 and a second electromagnetic induction pump 82 are disposed in the reservoir 33, at positions different from those of the first embodiment with respect to the conveyance path of workpiece, is also included in the present invention. Further, as shown in FIG. 5, the workpiece conveyance path may be oblique with respect to the reservoir 33 when viewed from the top.

Figure 6:
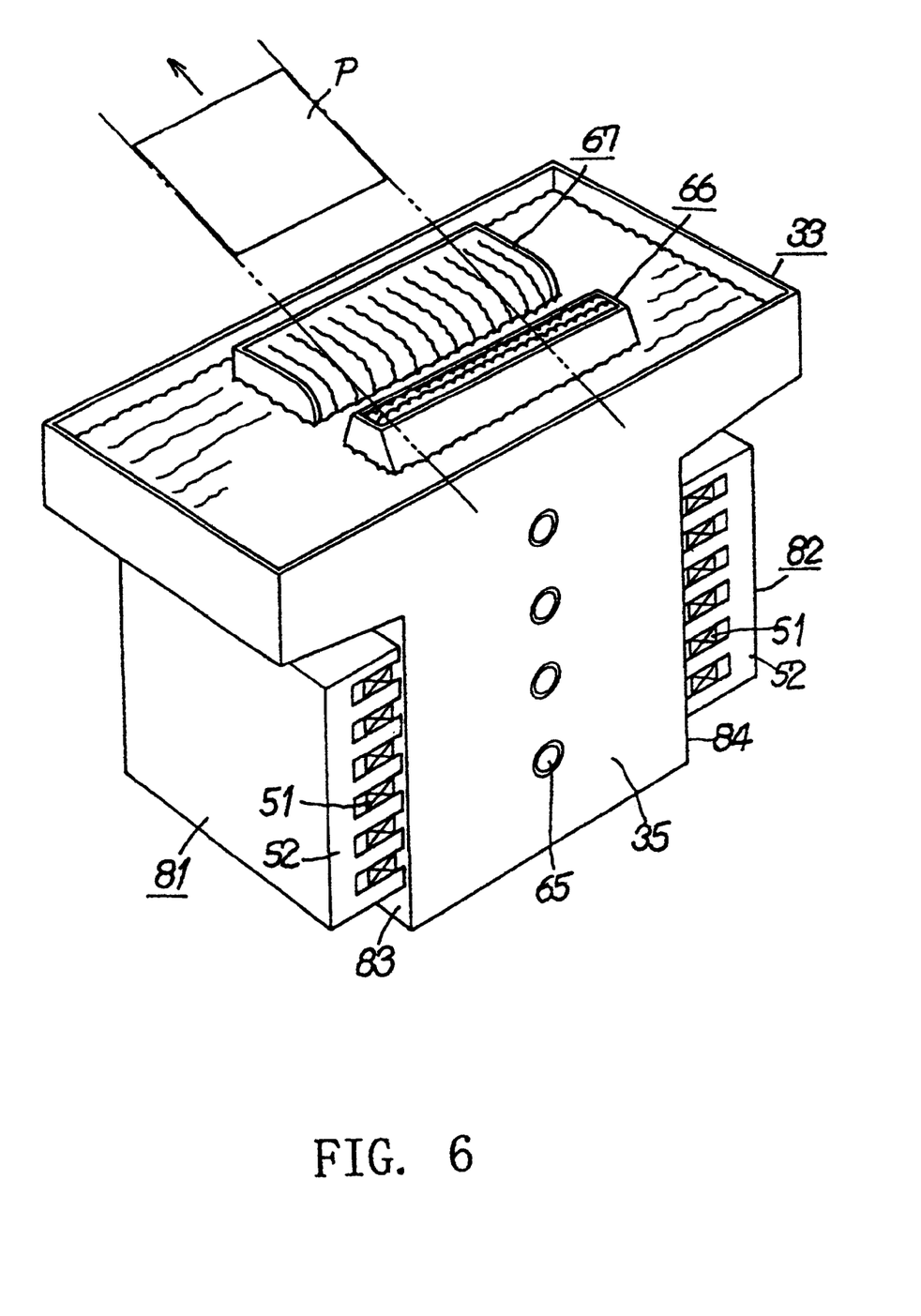
FIG. 6 is a perspective of the brazing apparatus shown in FIG. 4.

FIG. 6 is a perspective of the embodiment shown in FIG. 4, wherein the first and second electromagnetic induction pumps 81,82 extend vertically along a pair of vertical plate portions 83,84 of the vertical plate portions that form the reservoir 33, the first electromagnetic induction pump 81 extending respectively along the vertical plate portion 83 located at one side and the second electromagnetic induction pump 82 extending along the vertical plate portion 84 at the other side. Said vertical plate portions 83,84 are oppositely arranged, at the right and left with respect to the predetermined workpiece conveyance path.

According to this embodiment, the first electromagnetic induction pump 81 is provided with a brazing filler metal rising gap (not shown) which extends along the inner side face of the vertical plate portion 83 at the one side and communicates to the one side of the first and second nozzles 66,67, while the second electromagnetic induction pump 82 is provided, in the same manner as above, with a brazing filler metal rising gap (not shown) which extends along the inner side face of the vertical plate portion 84 at the other side and communicates to the other side of the first and second nozzles 66,67. A second iron core is disposed at the inner side of each brazing filler metal rising gap. Heaters 65 are inserted into a reservoir portion formed between the respective iron cores of the electromagnetic induction pumps 81,82 located at the lateral sides of the reservoir portion.

Figure 7:
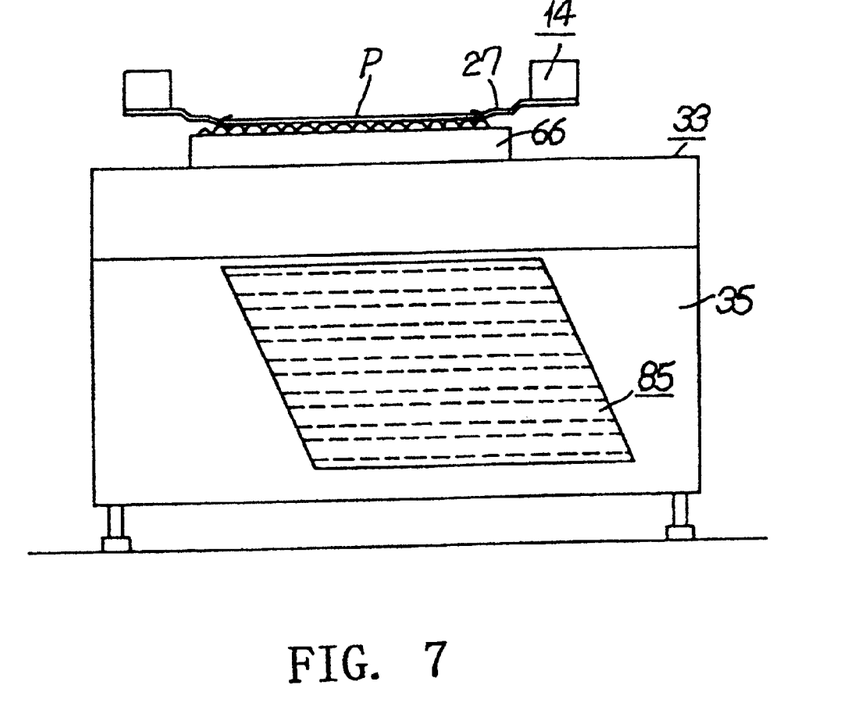
FIG. 7 is a front view of a brazing apparatus according to yet another embodiment of the invention.

FIG. 7 shows yet another embodiment of the present invention, wherein a first electromagnetic induction pump 85 and a second electromagnetic induction pump (not shown) extend diagonally in the vertical direction, along oppositely arranged vertical plate portions which form the reservoir 33, i. e. the first vertical plate portion 35 and the second plate portion. According to this embodiment, brazing filler metal rising gaps and second iron cores disposed at the inner sides of the first and the second vertical plates portions also extend diagonally in the vertical direction.

Figure 8:
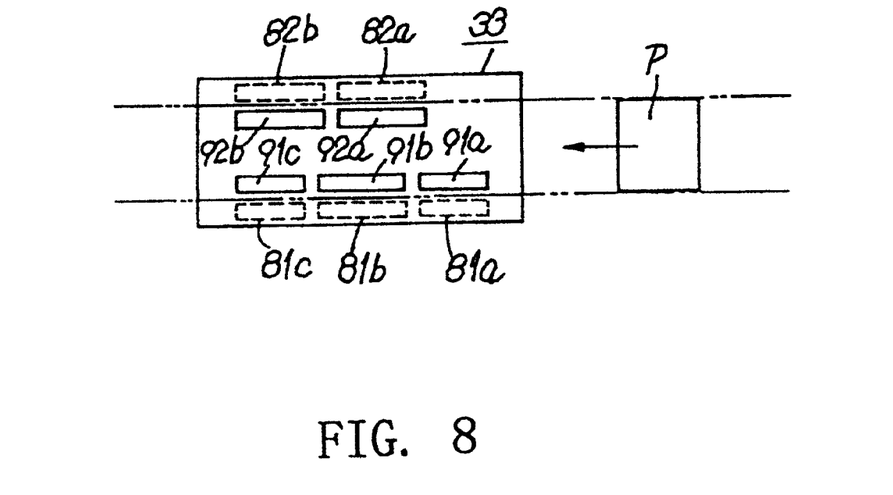
FIG. 8 is a front view of a brazing apparatus according to yet another embodiment of the invention.

FIG. 8 shows yet another embodiment of the present invention, wherein electromagnetic induction pumps 81*a*, 81*b*,81*c*,82*a*,82*b* and local nozzles 91*a*,91*b*,91*c*,92*a*,92*b* respectively corresponding to said electromagnetic induction pumps are arranged parallel to the direction in which workpieces P are conveyed. This embodiment is suitable for local brazing rather than ordinary general brazing, because portions above those selected from among the local nozzles 91*a*,91*b*,91*c*,92*a*,92*b* are brazed while workpieces P are at standstill above the reservoir 33.

As described above, the invention permits a plurality of electromagnetic induction pumps to be arranged compactly in such a manner as to extend vertically along a plurality of vertical plate portions which form a reservoir, and, by forming different types of overflow waves by means of these electromagnetic induction pumps, the invention ensures highly reliably brazing even if workpieces are printed circuit boards with chip components packaged on the surface thereof with a high density. Furthermore, the height and other characteristics of each wave can be adjusted separately through each respective electromagnetic induction pump.

As a plurality of electromagnetic induction pumps are commonly associated with a single reservoir, the inside of the reservoir can be formed compactly by disposing a plurality of vertical plate portions close to one another. In other words, as a reservoir is formed without wasting space, the quantity of the brazing filler metal in the reservoir can be reduced compared with a structure which calls for an individual reservoir for each pump. Therefore, the invention is especially suitable for cases where an expensive brazing filler metal which contains no lead is used.

In addition, as the first iron core and the induction coil of each electromagnetic induction pump are disposed outside the vertical plate portions that form the reservoir, maintenance of an induction coil or a similar operation can be easily done from the outside.

Another benefit of the invention lies in that heaters are disposed halfway between the electromagnetic induction pumps and commonly used by both parts. This configuration is effective in not only simplifying the structure concerning the heaters but also improving the operation efficiency of the heater.

Furthermore, as a nozzle is removably attached to the upper part of each electromagnetic induction pump, maintenance of a nozzle or cleaning of a electromagnetic induction pump to remove oxide or the like out of the electromagnetic induction pump from above can be easily done by removing the nozzle.

INDUSTRIAL APPLICABILITY

The present invention can be used not only for brazing chip components or the like mounted on the surface of a printed circuit board in the manner of a high-density packaging with brazing filler metal which contains no lead but also for soldering components to a substrate with a soldering material containing lead.

We claim:

1. A brazing apparatus comprising:

a reservoir;

a plurality of vertically extending vertical plate portions in said reservoir;

said reservoir is adapted to contain a brazing filler metal;

a plurality of electromagnetic induction pumps;

each of said plurality of electromagnetic induction pumps is disposed along respective vertical plate portions; and a generally vertically extending brazing filler metal rising gap between each of said electromagnetic induction pumps and its respective vertical plate portions permitting a said brazing filler metal contained in said reservoir to be moved upward by electromagnetic induction whereby said brazing filler metal is enabled to contact a surface of a workpiece located thereabove.

2. A brazing apparatus as claimed in claim 1, wherein said plurality of electromagnetic induction pumps are associated with a single reservoir.

3. A brazing apparatus as claimed in claim 1 wherein each electromagnetic induction pump includes:

a first iron core disposed in close contact with an outer side face of its respective vertical plate portion;

an induction coil wound around said first iron core;

a second iron core disposed parallel to an inner side face of said vertical plate portion; and said brazing filler metal rising gap being defined by the vertical plate portion and the second iron core.

4. A brazing apparatus as claimed in claim 1, wherein said reservoir is provided with heaters for melting brazing filler metal, said heaters disposed between said plurality of electromagnetic induction pumps.

5. A brazing apparatus as claimed in claim 1, further comprising:

a plurality of removable nozzles;

said removable nozzles being respectively disposed on the electromagnetic induction pumps; and said removable nozzles including means for permitting ejection of brazing filler metal therefrom.

6. A brazing apparatus comprising:

a reservoir for containing melted brazing filler metal;

at least first and second electromagnetic induction pumps in said reservoir;

said at least first and second electromagnetic induction pumps being effective for pumping said melted brazing filler metal toward a workpiece; and a first nozzle receiving said melted brazing filler metal from said first electromagnetic induction pump;

said second nozzle receiving said melted brazing filler metal from said second electromagnetic induction pump; and said first nozzle and said second nozzle having openings which produce first and second different patterns.

7. Apparatus according to claim 6, wherein said first pattern includes an irregular moving pattern, and said second pattern includes a smooth arc-shaped wave pattern directed in opposite to a direction of movement of said workpiece.

8. Apparatus according to claim 6, wherein said first and second nozzles are removable, whereby said at least first and second electromagnetic induction pumps are accessible.

9. A brazing apparatus comprising:

a reservoir for containing a brazing filler metal;

means for melting said brazing filler metal in said reservoir;

at least first and second electromagnetic induction pumps in said reservoir;

a first nozzle receiving molten brazing filler metal from said first electromagnetic induction pump;

a second nozzle receiving molten brazing filler metal from said second electromagnetic induction pump;

said first nozzle producing a first pattern of ejected molten brazing filler metal;

said second nozzle producing a second pattern of ejected molten brazing filler metal; and said first and second patterns being different.

* * * * *